United States Patent
DeOtte

(10) Patent No.: US 8,350,960 B2
(45) Date of Patent: Jan. 8, 2013

(54) PROMPTING DEVICE

(76) Inventor: Richard William DeOtte, Southlake, TX (US)

(*) Notice: Subject to any disclaimer, the term of this patent is extended or adjusted under 35 U.S.C. 154(b) by 685 days.

(21) Appl. No.: 12/558,120

(22) Filed: Sep. 11, 2009

(65) Prior Publication Data

US 2010/0182513 A1   Jul. 22, 2010

Related U.S. Application Data

(60) Provisional application No. 61/146,446, filed on Jan. 22, 2009.

(51) Int. Cl.
*H04N 5/225* (2006.01)
*H04N 5/222* (2006.01)

(52) U.S. Cl. ..................... 348/375; 348/772

(58) Field of Classification Search .............. 348/375, 348/722, 373, 61, 14.01, 14.16, 14.08; 353/119, 353/122, 103, 113, 29, 98; 396/1; 715/202
See application file for complete search history.

(56) References Cited

U.S. PATENT DOCUMENTS

| | | | | |
|---|---|---|---|---|
| 2,711,667 A * | 6/1955 | Simjian | ................... | 348/722 |
| 2,796,801 A | 6/1957 | Simjian | | |
| 2,883,902 A | 4/1959 | Oppenheimer | | |
| 2,926,559 A | 3/1960 | Oppenheimer | | |
| 4,049,907 A | 9/1977 | Damon | | |
| 4,894,722 A * | 1/1990 | Suzuki | ................... | 348/722 |
| 5,159,445 A * | 10/1992 | Gitlin et al. | ............. | 348/14.01 |
| 5,194,955 A * | 3/1993 | Yoneta et al. | ............. | 348/14.01 |
| 5,373,333 A * | 12/1994 | Kawada et al. | ............. | 353/122 |
| 5,485,226 A | 1/1996 | Chipperfield | | |
| 5,666,153 A * | 9/1997 | Copeland | ................... | 348/373 |
| 5,721,586 A | 2/1998 | Shimamura | | |
| 5,771,436 A * | 6/1998 | Ikehama | ................... | 348/14.08 |
| 5,890,787 A * | 4/1999 | McNelley et al. | ............. | 353/28 |
| 5,923,469 A * | 7/1999 | Machtig et al. | ............. | 359/451 |
| 6,044,226 A * | 3/2000 | McWilliams | ............. | 348/722 |
| 6,104,424 A * | 8/2000 | McNelley | ............. | 348/14.16 |
| 6,243,130 B1 * | 6/2001 | McNelley et al. | ............. | 359/296 |
| 6,280,039 B1 * | 8/2001 | Barber | ................... | 348/375 |
| 6,710,797 B1 * | 3/2004 | McNelley et al. | ............. | 348/14.16 |
| 6,717,619 B2 * | 4/2004 | Wasada | ................... | 348/722 |
| 6,834,968 B2 * | 12/2004 | Peatross et al. | ............. | 348/722 |
| 6,980,253 B1 * | 12/2005 | Matsui | ................... | 348/722 |
| 7,057,637 B2 * | 6/2006 | White | ................... | 348/14.16 |
| 7,760,229 B2 * | 7/2010 | White | ................... | 348/14.16 |
| 7,806,533 B2 * | 10/2010 | Boute et al. | ............. | 348/14.01 |
| 2008/0309889 A1 * | 12/2008 | Rivera | ................... | 353/122 |
| 2009/0256970 A1 * | 10/2009 | Bilbrey et al. | ............. | 348/722 |

* cited by examiner

*Primary Examiner* — Aung S Moe
(74) *Attorney, Agent, or Firm* — Decker Jones, et al; Brian K. Yost; Geoffrey A. Mantooth

(57) ABSTRACT

The prompting device has a frame, a plurality of reflective panes, and support members and may be used on a desktop by a home or small business user to read a script in a natural manner while speaking to a camera or other video capturing device. In the preferred embodiment, the frame has a user side and a camera side, and is lightweight and readily collapsible such that it may be easily stored when not in use. A collecting pane reflects an image onto a viewing pane, so as to create a displayed image which may be viewed by a user. The viewing pane is generally transparent allowing a user to be recorded or photographed through the viewing pane. In another embodiment the prompting device has an opaque cover. The support assemblies are adjustable in height and the panes have an adjustable angle. In another embodiment the support assemblies are hangers. In another embodiment the image is an image reflected from a computer monitor and may be scrolling text.

23 Claims, 2 Drawing Sheets

PROMPTING DEVICE

This application claims the benefit of U.S. Provisional Patent Application No. 61/146,446 filed Jan. 22, 2009.

BACKGROUND OF THE INVENTION

1. Field of the Invention

The present invention relates generally to prompting devices and specifically to a light weight portable prompting device that may be used on a desktop by a home or small business user to read a script in a natural manner while speaking to a camera or other video capturing device.

2. Description of the Prior Art

Face to face communication is one of the most desirable ways to communicate ideas, thoughts, feelings, and emotions. Until relatively recently, face to face communication was, just that, communication between one or more persons in near proximity to one another. As more advanced communication techniques developed, mankind began to communicate over great distances. However, while the ability to communicate increased, the quality of these communications has, at time, suffered. For example, while the radio allows messages to be communicated simultaneously to millions, and the telephone permits direct audio interaction over great distances, these methods rely entirely on audible signals, or sounds, for the communication. Sounds are but a small part of effective communication.

In the early 20$^{th}$ century, motion picture and television technology greatly improved the ability to communicate in that visual images, as well as sounds, could now be recorded and transmitted. Through this new medium, there was for the first time, the ability to transmit a person's voice, appearance, and demeanor over long distances and communicate the verbal and nonverbal information that contribute to effective communication. With this new form of communication, it soon became desirable to be able to look directly into a camera while reading prepared materials.

In the 1950's, Jess Oppenheimer invented the first teleprompter, resulting in U.S. Pat. No. 2,883,902. Thereafter, other conventional devices were developed which also allowed a person, such as an actor or newscaster, to speak directly into a commercial camera while reading. However, such devices have many drawbacks. For example, conventional devices are made for industrial equipment, are mounted on expensive cameras and are otherwise made for use in professional studios.

In recent years, a growing need for non-audio/visual professionals to effectively communicate has developed. This need has arisen due to the development and increased popularity of portable cameras, laptop computers, video conferencing, and the internet. For example, an accountant may desire to participate in a video conference while referring to a balance sheet. Additionally, some small businesses may desire to prepare short video messages concerning products and services and to post such videos on repository websites such as YouTube®. Such websites permit users to upload videos to be viewed by virtually anyone with internet access. Most uploads are produced by individuals with few technical resources and little production experience. In many cases, video messages recorded by home or small business users have an amateurish or awkward look and feel. This may be due, in part, to the presentation having been memorized, ad libbed, or read. Using the foregoing methods often results in unnatural and ineffective communication. What is needed is a lightweight and inexpensive prompting device that enables the user to appear to be looking directly into a camera while viewing an image or reading a script. The present invention provides such a device.

SUMMARY OF THE INVENTION

It is an object of the invention to provide a lightweight and inexpensive prompting device that may be used on a desktop and enables a user to appear to be looking directly into a camera while viewing an image such as a script.

The prompting device of the present invention is comprised of a frame, a plurality of reflective panes, and support members. In the preferred embodiment, the frame has a user side and a camera side, and is lightweight and readily collapsible such that it may be easily stored when not in use. In the operating position, the reflective panes are arranged such that a first reflective pane, or collecting pane, reflects an image onto a second reflective pane, or viewing pane, so as to create a displayed image which may be viewed by a user positioned on the user side of the frame. The viewing pane is generally transparent and arranged such that a user positioned on the user side may be recorded or photographed through the viewing pane by a camera positioned on the camera side. In the preferred embodiment, each pane is enclosed in a pane enclosure, each enclosure being pivotally coupled to the frame so that the panes may be safely adjusted to many angles depending upon the needs of the user. In the preferred embodiment, the frame is maintained in the operating position by a plurality of support assemblies. In the preferred embodiment these support assemblies are comprised of legs and leg supports. Therefore, the prompting device is sturdy and may be adjusted to accommodate equipment of many shapes and sizes. For example, the prompting device may be used with virtually any monitor, including a CRT monitor, flat screen monitor, or lap top monitor. The device may also be adapted for use with several camera positions. For instance, the device may be used with a lap top computer having an integrated camera, or may be used with a camera mounted on or secured to a monitor. The device may also be used with a stand alone camera positioned behind the monitor.

In another embodiment of the present invention, the prompting device is comprised of an opaque cover, or shroud, capable of reducing glare on the second pane.

In another embodiment of the present invention, the support assemblies are adjustable in height.

In another embodiment of the present invention, the first and second panes have an adjustable angle.

In another embodiment of the present invention, the support assemblies are comprised of hangers capable of maintaining the prompting device in position.

In another embodiment of the present invention, prompting device is collapsible and easily stored.

In another embodiment of the present invention, the image is an image reflected from a computer monitor.

In another embodiment of the present invention, the computer monitor is a lap top monitor.

In another embodiment of the present invention, the image is comprised of scrolling text.

DESCRIPTION OF THE PREFERRED EMBODIMENT

Figure 1:
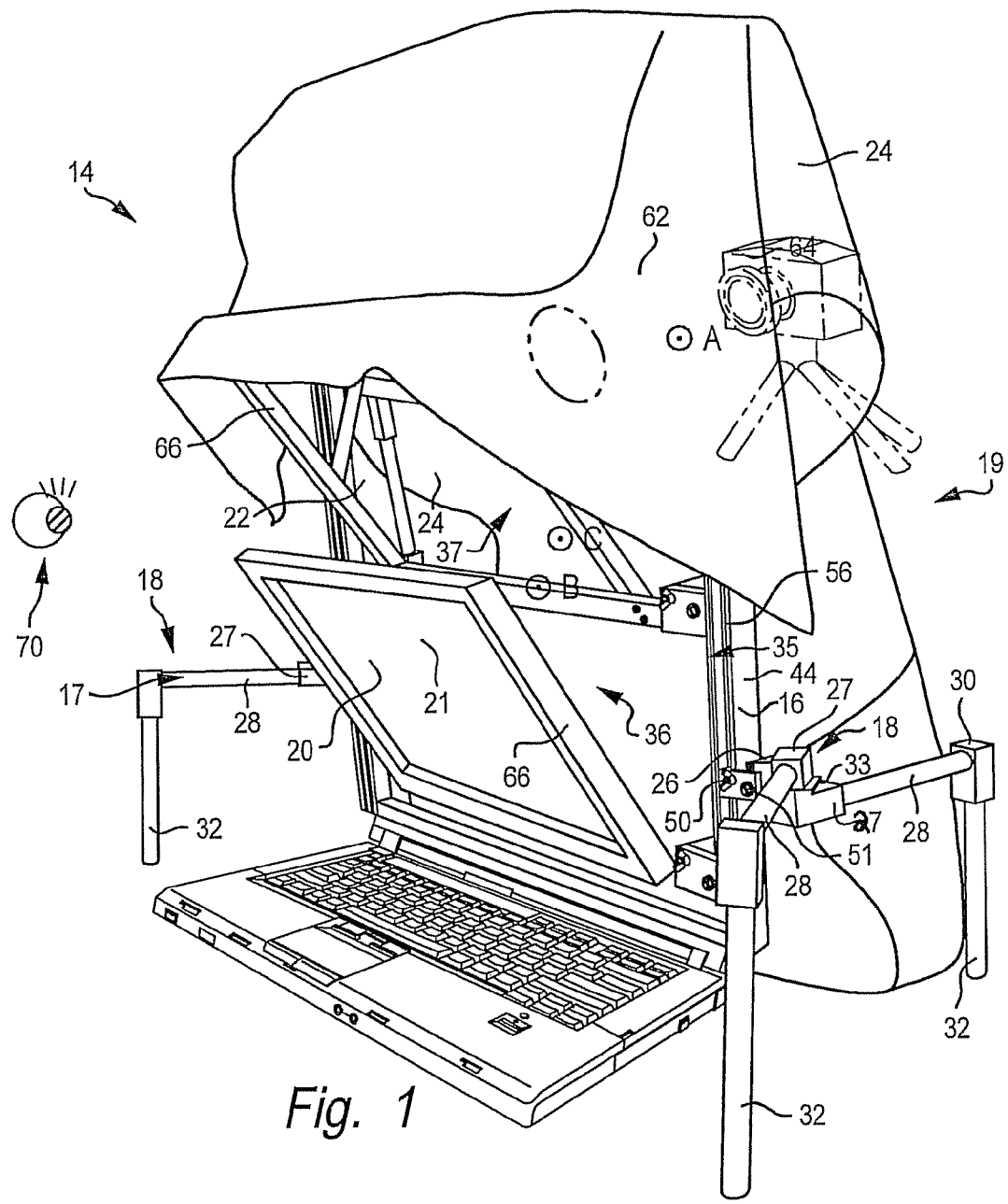
FIG. 1 is an isometric left and front side view of the prompting device of the present invention in accordance with a preferred embodiment with a laptop computer in place and the cover in position.
Figure 2:
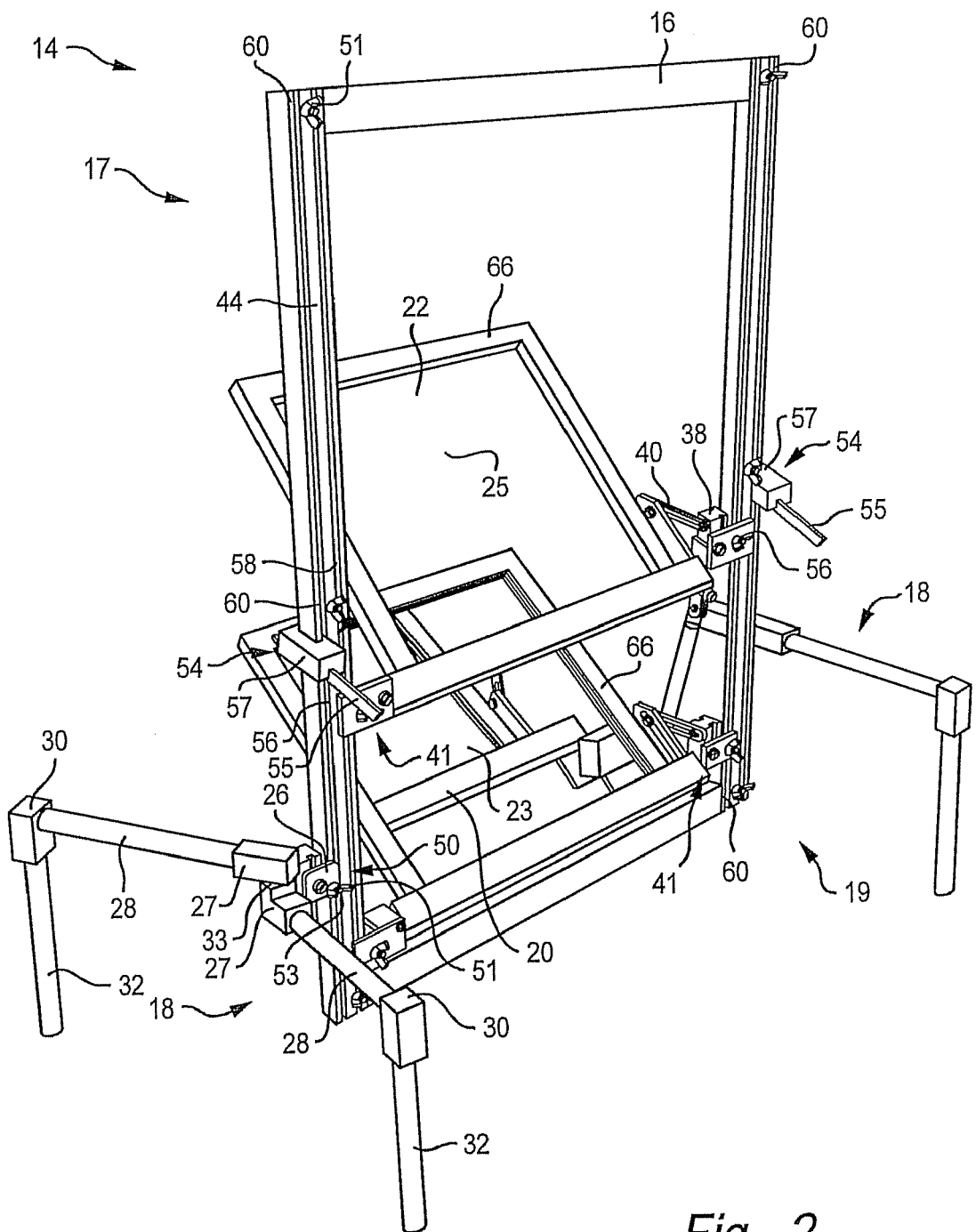
FIG. 2 is an isometric right and rear view of the prompting device of the present invention in accordance with a preferred embodiment without the cover in position.

In FIGS. 1 and 2, there is shown an prompting device 14 in accordance with a preferred embodiment. The prompting device 14 of the present invention is comprised of a frame 16, a plurality of reflective panes 20, 22, a support assembly 18. In the preferred embodiment, the frame 16 has a user side 17 and a camera side 19, and is lightweight and readily collapsible such that it may be easily stored when not in use. In the preferred embodiment, two reflective panes 20, 22 are arranged such that the first reflective 20 pane is capable of reflecting an image 36 onto the second reflective pane 22. The first reflective pane 20, or collecting pane 20, is comprised of an opaque side 21 (FIG. 1) and a reversing side 23 (FIG. 2). The second reflective pane 22, or viewing pane 22, is comprised of a user side 23 (FIG. 1) and a camera side 25 (FIG. 2). In the operating position, the reflective panes 20, 22 are arranged such that the collecting pane 20 reflects an image 36 (FIG. 1) onto the viewing pane 22, so as to create a displayed image 37 which may be viewed by a user 70 positioned on the user side 17 of the frame 16.

The viewing pane 22 is generally transparent and arranged such that a user 70 positioned on the user side 17 may be recorded or photographed through the viewing pane 22 by a camera 64 positioned on the camera side 19. In the preferred embodiment, the viewing pane 22 is very thin, having approximately a ⅛ inch thickness. However, the viewing pane 22 need not be ⅛ inch thick. Rather, it can be thicker or thinner while still allowing the user 70 to view the displayed image 37.

In FIG. 1 three alternative camera locations are shown, at A, B and C. Thus, the viewing pane 22 is capable of displaying the displayed image 37 and permits a camera 64 positioned at any one of the alternative locations A,B,C to photograph or record an image of a user 70 (user image) through the viewing pane 22.

In the preferred embodiment, each pane 20, 22 is enclosed in a pane enclosure 66, each enclosure 66 being pivotally coupled to the frame 16. In the preferred embodiment, the frame 16 is maintained in the operating position by a plurality of support assemblies 18.

Referring to FIGS. 1 and 2, the prompting device 14 of the preferred embodiment may be maintained in an upright position by either the support assemblies 18, 18 or the hangers 54, 54.

Referring to FIG. 2, there are two support assemblies 18, 18 coupled to the frame sides 44, 44, one on each side 44. These support assemblies 18, 18 may be independently adjusted to account for surface variations and help maintain the prompting device 14 in a proper orientation. In the preferred embodiment, each support assembly 18 is comprised of a leg support bracket 26, horizontal couplers 27, crosspieces 28, vertical couplers and legs 32. The leg support bracket 26 is slideably coupled to the frame 16 such that the height of the prompting device 14 may be adjusted. As may be seen in FIG. 2, the leg support bracket 26 is capable of being inserted into leg grooves 56 located near the outside edge of frame sides 44, 44 on the user side 17 and camera side 19 of the frame 16. A fastener 50 intersects user side 17 and camera side 19 of the leg support bracket 26 such that leg support bracket 26 may be tightened against the frame 16. In the preferred embodiment, fastener 50 is a flat head screw 53 (FIG. 2) and wing nut 51 assembly (FIG. 1). However, any conventional fastener system that will maintain the support assembly 18 in the desired position may be used. The leg support bracket 26 is further comprised of a crosspiece mounting surface 33. This surface 33 extends from the side of the leg support bracket 26 and serves as a mounting surface for horizontal coupler 27.

Horizontal coupler 27 is pivotally coupled to mounting surface 33. The horizontal and vertical couplers 27, 30 are each comprised of an opening (not shown) capable of receiving the respective end of the crosspiece 28 such that the crosspiece extends generally horizontally from the horizontal coupler 28. Frictionally coupled to the horizontal coupler 27 within this opening is one end of the crosspiece 28. The crosspiece 27 extends generally horizontally from the horizontal coupler 27 and is frictionally coupled at its far end with the vertical coupler 30. On the lower side of the vertical coupler 30 is a second opening (not shown) capable of receiving the upper end of the leg 32. The leg 32 is frictionally coupled to the vertical coupler 30 through this opening.

Thus, in the operating position, the leg assembly 18 is fully adjustable. Each horizontal coupler 27 may be pivoted forward or backward to either narrow or widen the distance between the two legs 32, 32. Each vertical coupler 30 may be pivoted upward and downward to alter the plane on which the lower part of the legs 32 rest.

Referring to FIG. 2, the prompting device is further comprised of hangers 54, 54. These hangers 54 permit the device 14 to be positioned in front of a computer monitor 35 such as a flat screen monitor 35 by using the hangers 54, 54 to hang the device 14 over the top of the screen 35. Each hanger 54 is comprised of an angled arm 55 and a hanger bracket 57. The hanger bracket 57, as may be seen in FIG. 2, is capable of being inserted into pane and hanger grooves 58 located near the inside edge of frame sides 44, 44 on the user side 17 and camera side 19 of the frame 16. A fastener 50 intersects user side 17 and camera side 19 of the hanger support bracket 57 such that the hanger support bracket 57 may be tightened against the frame 16.

A reflective pane support assembly 41 is comprised of an angle adjustment bracket 40 and a pane support bracket 38. The reflective panes 20, 22 are confined within pane enclosures 66. These pane enclosures 68, 66 are pivotally coupled to an angle adjustment bracket 40. The angle adjustment bracket 40 is slideably coupled to the pane support bracket 38. This pane support bracket 38 is slideably coupled to the frame 16 such that the height of the reflective panes 20, 22 may be adjusted. As may be seen in FIG. 2, the pane support bracket 38 is capable of being inserted into pane and hanger grooves 58 located near the inside edge of frame sides 44, 44 on the user side 17 and camera side 19 of the frame 16. The angle of the reflective pane 20, 22 may be adjusted by loosening the adjustment wing nut 51.

In another embodiment of the present invention, the prompting device 14 is comprised of an opaque cover 24 (FIG. 1). Because ambient light may create a glare on the viewing pane 22, it may sometimes be useful to cover the camera side 19 and sides 44 of the prompting device 14 to reduce this glare. Referring to FIG. 1, in the preferred embodiment, the cover 24 is draped over the viewing pane 22 enclosure 66, sides, and camera side 19 of the device 14 such that the reflective panes 20, 22 are partially shielded. In the preferred embodiment, there is an opening 62 in the cover to allow a camera 64 to photograph the user with the cover 24 in place.

In the preferred embodiment of the present invention, prompting device 14 is collapsible and easily stored when not in use. Each of the coupling points discussed above allow the component parts of the prompting device 14 to be readily assembled and disassembled. The frame 16 has frame joints 60 which allow the frame 16 to be broken down. In the preferred embodiment, these joints 60 are comprised of rabbets and tenons. The joint 60 is further secured with a fastening device 50 such as a screw 53 and wing nut 51. The leg support assemblies 18 and the pane support assemblies 41 are also removably coupled. Therefore, the component parts of each assembly 18, 41 may be readily decoupled from each other. The disassembled device 14, may then be stored in a small light weight storage case.

The operation and use of the prompting device 14 will now be discussed. The device 14 is assembled and positioned such that the collecting pane 20 is placed in front of an image 36, such as that which is displayed on a computer screen 34. The height of the frame 16 may be suitably adjusted by sliding the leg support brackets 26 up and down the frame 16 within the leg grooves 56 and tightening the fastener 50 so that the bracket 26 is secured to the desired portion of the frame 16. The legs 32 may be pivoted forward and backward and upward and downward to a desired position by use of the horizontal 27 and vertical 30 couplers, respectively.

Alternatively, the device 14 can be hung over the computer screen 34 such that the hangers 54 suspend the device 14 in the proper position. The hangers 54 can each be adjusted by sliding the hangers 54 up or down within the pane and hanger grooves 58 to the desired position.

The angle of the collecting pane 20 may be adjusted, using the adjustment screw 60 on the angle bracket 40 so that the image 36 is reflected onto the viewing pane 22 to create a displayed image 37. The viewing pane 22 is positioned, by adjusting the height and angle so that a user 70 positioned on the user side 17 of the device 14 may see the displayed image 37 reflected from the computer screen 34 by the collecting pane 20.

The viewing pane 22 is further positioned such that a camera 64 located on the camera side 19 of the device 14 may photograph the user 70 through the viewing pane 22 at the same time the user 70 is viewing the displayed image 37.

A cover 24, when placed in the position shown in FIG. 1, prevents ambient or direct light from reflecting off the camera side 19 of the viewing pane 22 back to the camera 64. The cover 24 also prevents glare produced by such light from obscuring the user's 70 ability to see or discern the image 36. The camera 64, may capture the user's 70 image through an opening 62 in the cover 24.

When the prompting device 14 is arranged and positioned in this manner, virtually any image 36 capable of being displayed on a computer screen 34 may be displayed on the viewing pane 22. The image 36 may be comprised of scrolling text which allows the prompting device 14 to be used as a teleprompter or autocue. Alternatively, the image 36 may be stationary text displayed on a computer screen 34 or text which is simply written on a writing surface and placed so that it can be reflected onto the viewing pane 22. If the image 36 does not need to be reversed, it may be simply placed on the surface of the collecting pane 20 so that the image 36 is reflected onto the viewing pane 22.

While there has been illustrated and described what is, at present, considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed as the best mode contemplated for carrying out the invention, but that the invention will include all embodiments falling within the scope of the appended claims.

I claim:

1. A prompting device comprising:
   a support, a first reflective pane and a second reflective pane coupled to said support, and hangers, said hangers being capable of being used to suspend the device over a computer screen;
   wherein said first reflective pane is capable of reflecting an image onto said second reflective pane so as to create a displayed image which may be viewed by a user while a camera captures a user image through said second reflective pane; and
   wherein said prompting device is structured and arranged so as to be capable of being used on a desktop.

2. The prompting device of claim 1 wherein said support is a frame.

3. The prompting device of claim 1 further comprised of support members capable of maintaining the device in a generally upright position.

4. The prompting device of claim 3 wherein said support members are comprised of legs.

5. The prompting device of claim 1 wherein said first reflective pane has an angle, said angle being adjustable.

6. The prompting device of claim 1 wherein said second reflective pane has an angle, said angle being adjustable.

7. The prompting device of claim 1 wherein said second reflective pane has a height, said height being adjustable.

8. The prompting device of claim 1 wherein said first reflective pane has a height, said height being adjustable.

9. The prompting device of claim 1 wherein said hangers are adjustable.

10. The prompting device of claim 1 further comprising a cover capable of reducing a glare on said second reflective pane.

11. The prompting device of claim 1 wherein said first reflective pane has an opaque side.

12. The prompting device of claim 1 wherein said second reflective pane is transparent.

13. The prompting device of claim 1 wherein said displayed image is reflected from a computer screen.

14. The prompting device of claim 1 wherein said displayed image comprises scrolling text.

15. The prompting device of claim 1 wherein the prompting device is collapsible such that it may be easily stored when not in use.

16. A prompting device capable of being used on a desktop, said prompting device comprising: a frame, a first reflective pane, a second reflective pane, and hangers, said hangers being capable of being used to suspend the device over a computer screen;
   wherein said first and second reflective panes are slideably coupled to said frame;
   said first and second reflective panes each having an adjustable angle and height; and
   wherein said first reflective pane is capable of reflecting an image onto said second reflective pane so as to create a displayed image which may be viewed by a user while a video is taken of said user through said second reflective pane.

17. The prompting device of claim 16 wherein the prompting device is collapsible such that it may be easily stored when not in use.

18. A prompting device comprising:
   a frame, a first reflective pane, a second reflective pane, a plurality of legs, and a computer screen, said legs and first and second reflective panes being coupled to said frame;

wherein said first reflective pane is capable of reflecting an image from said computer screen onto said second reflective pane so as to create a displayed image which may be viewed by a user while a camera captures a user image through said second reflective pane; and wherein said prompting device is structured and arranged so as to be capable of being used on a desktop.

19. The prompting device of claim 18, wherein said legs are adjustable and structured and arranged so as to be capable of maintaining the device in a generally upright position.

20. The prompting device of claim 18, said first and second reflective panes each having an angle, said angle of each being adjustable.

21. The prompting device of claim 18, said first and second reflective panes each having a height, said height of each being adjustable.

22. A method of using a prompting device comprising the steps of:
   providing a prompting device comprising a support, a first reflective pane, a second reflective pane, and one or more hangers, said first and second reflective panes and said one or more hangers being coupled to said support;
   using the one or more hangers to suspend the device over a computer screen;
   displaying a displayed image on the second reflective pane, said displayed image having been reflected from the first reflective pane;
   providing a camera for capturing a user image through said second reflective pane; and
   using said camera to capture the user image while a user views the displayed image on the second reflective pane.

23. A method of using a prompting device comprising the steps of:
   providing a prompting device and a computer screen, said prompting device comprising a frame, a first reflective pane, a second reflective pane, a plurality of legs, said legs and first and second reflective panes being coupled to said frame;
   positioning said prompting device between a user and said computer screen;
   displaying a displayed image on the second reflective pane, said displayed image having been reflected from the first reflective pane;
   providing a camera for capturing a user image through said second reflective pane; and
   using said camera to capture the user image while the user views the displayed image on the second reflective pane.

* * * * *